United States Patent Office 3,491,262
Patented Jan. 20, 1970

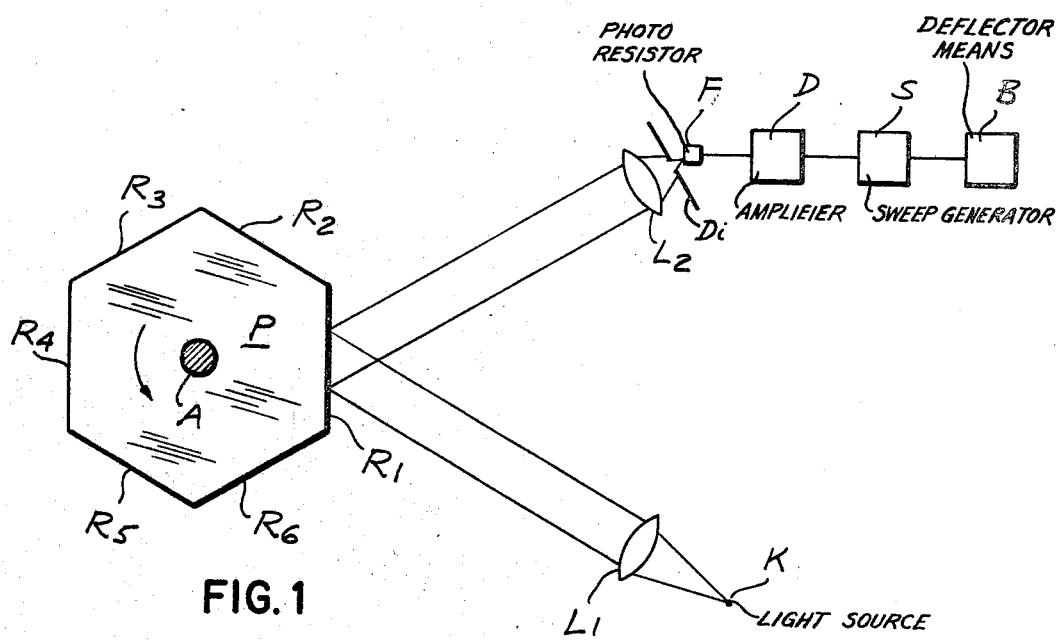
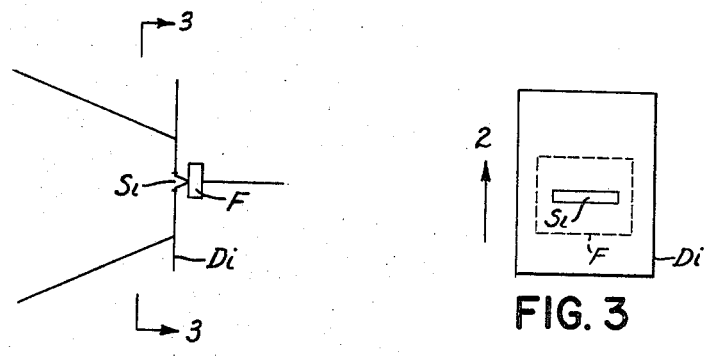

3,491,262
CONTROL DEVICE FOR CONTROLLING THE DEFLECTION OF THE ELECTRON BEAM OF A CATHODE RAY TUBE
Tore Bertil Reinhold Olsson, Karlskoga, Sweden, assignor to Aktiebolaget Bofors, Karlskoga, Sweden, a joint-stock company of Sweden
Filed Jan. 2, 1968, Ser. No. 695,201
Claims priority, application Sweden, Mar. 6, 1967, 3,067/67
Int. Cl. H01j 29/70
U.S. Cl. 315—19    6 Claims

ABSTRACT OF THE DISCLOSURE

There is disclosed a control device for controlling beam deflecting means for deflecting the beam of a cathode ray oscilloscope. The deflecting means are activated by a signal sent to the same by a sweep generator which in turn is activated by the activation of a light sensitive device. The light sensitive device is controlled by incident light deflected upon it when a rotary prism is in a predetermined angular position thereby controlling the moment of time at which the sweep generator begins a sweep.

---

The present invention relates to a control device for controlling beam deflecting means for deflecting the beam of an oscilloscope of a cathode ray tube, and more particularly to a control device of the general kind above referred to for a cathode ray oscilloscope the electron beam of which emanating from the electron gun of the oscilloscope is deflected by a sweep generator in two directions normal to each other.

Sweep generators as are used in oscilloscopes of the general kind above referred to, are frequently pivotally arranged and include means for controlling the repeat pattern of the pivotal movements of the generator.

For certain applications it is desirable that the sweep generator always slants its sweep at a predetermined moment of time in relation to the occurrence of a given event. To effect such time controlled starting of the sweep it is known to feed a synchronizing signal usually referred to as sync-signal to the sweep generator. This signal activates the sweep generator, either immediately or after a pre-determined time delay.

The sweep generator when activated generally produces a saw-tooth output signal which is fed to the deflecting means of the oscilloscope. The design of the sweep generator as such and the manner in which the sync-signal activates the generator do not constitute part of the present invention. They are presumed to be conventional and are, hence, not described in detail.

As will be more fully explained hereinafter, a control device of the invention is particularly advantageous for use with television cameras operating within the infrared wave range. According to the present state of the art, the image in such infra-red television cameras is generally scanned by an optical scanning system which due to the involved range of the wave length in preferably composed of mirrors. The general practice is to use a tilting mirror for the actual splitting of the image and a rotary light deviating prism such as a mirror prism having several light reflecting peripheral surfaces for line splitting.

It is known to mount a light sensitive device such as a photoelectric device operationally fixed on the shaft for rotating the mirror prism, but preferably adjustable in reference thereto. This photoelectric device is connected to feed sync-signals to the sweep generator in accordance with the rotation of the prism and the sweep generator, in turn, activates the deflecting means of the oscilloscope as previously described. As is evident, the sync-signals received by the sweep generator are controlled by the angular positions of the drive shaft of the rotary prism. Accordingly, the moment of time at which the sweep generator starts a sweep can, at least in theory, be accurately controlled by the angular position of the drive shaft. However, in actual practice it has been found that due to manufacturing problems it is very difficult to assure that the angular positions of the reflecting surfaces of the rotary prism, which successively deflect a light beam upon the photoelectric device causing in turn activation of the sweep generator, always correspond accurately to the same angular positions of the drive shaft. If, for instance, the angles at which the several reflecting surfaces of the rotary prism meet are not exactly uniform, or if due to external operational conditions such as temperature stresses, etc., the spatial positions of the reflecting surfaces change slightly the moment at which a sync-signal is received by the sweep generator via the photoelectric device will no longer accurately correspond to the same angular position of the drive shaft and hence also not to the same angular position of the respective prism surface in relation to a selected point of reference or datum value.

It is a broad object of the invention to provide a novel and improved control device for controlling the beam deflecting means of a cathode ray oscilloscope by feeding a sync-signal to the sweep generator of the oscilloscope at a selected and accurately controllable moment of time.

A more specific object of the invention is to provide a novel and improved control device for controlling the deflection of the beam of a cathode ray oscilloscope by controlling the activation of the sweep generator of the oscilloscope by the angular positions of a rotary prism which at a selected moment of time is in an angular position required for activating the sweep generator.

Another more specific object of the invention is to provide a novel and improved control device for deflecting the beam of a cathode ray oscilloscope in which light beams reflected by successive reflecting surfaces of the rotary prism are utilized to activate the sweep generator of the oscilloscope via a light sensitive means such as a photoelectric means, for instance, a photo-diode.

The invention broadly resides in directing a preferably collimated beam of light upon a rotary prism having several reflecting peripheral surfaces which successively direct the beam, after focusing the same by a suitable lens system, upon a light sensitive device which, in turn, directs pulse signals to the sweep generator, preferably via a suitable amplifier. As is evident, the excitation of the light sensitive device and with it the activation of the sweep generator, are controlled by the angular positions of the reflecting surfaces of the prism at selected moments of time.

Other and further objects, features and advantages of the invention will be pointed out hereinafter and set forth in the appended claims constituting part of the application.

In the accompanying drawing an embodiment of the invention is shown by way of illustration and not by way of limitation.

In the drawing:

FIG. 1 shows a diagrammatic control device according to the invention;

FIG. 2 is a detailed view of the device on an enlarged scale; and

FIG. 3 is a front view of FIG. 2 as seen in the direction of line 3—3 of FIG. 2.

Referring now to the drawing more in detail, there is shown a rotary prism and more specifically by way of example, a hexagonal prism having six reflecting surfaces R1 to R6. The prism is seated on a drive shaft A driven by any suitable drive means (not shown). The prism may be composed of appropriately mounted plane mirrors but preferably it is a polygonal one-piece steel mirror having equilateral reflecting sides. The direction of rotation is indicated by an arrow.

A light source K such as an incandescent lamp having a filament directs a beam of light toward the prism. The beam is preferably collimated by a lens L1. The parallel beam emerging from lens L1 is reflected by successive reflecting surfaces such as the surface R1 to a condensing lense means L2. As is evident, the light beam impinges upon lens L2 only when the rotary prism or more specifically the reflecting surface R1 thereof is in a specific angular position such as the illustrated position. Lens system L2 focuses the beam so that it is incident upon a light sensitive device F. The device F may be a photoelectric device such as a photo-diode or a photo-resistor. Suitable light sensitive devices are well known in the market and readily available in the market. The specific design of the devices does not constitute part of the invention.

Excitation of the device by the light focused thereupon changes a parameter or physical magnitude of the device such as the resistance thereof when the device is in the form of a photo-resistor. The change in parameter is amplified by a suitable amplifier D connected to device F. The input to the amplifier may be obtained in a conventional manner by connecting an impedance means in series with device F and a voltage source when the device F is a photo-resistor.

The amplifier may be, for instance, a linear transitorized amplifier amplifying without appreciable delay. However, an amplifier including vacuum tubes of conventional design may also be used.

The gain of amplifier D is such that the signal pulse generated by photo-resistor F each time the same is excited by the focused light beam impinging thereupon, is amplified by the amplifier sufficiently to trigger a sweep generator S which also should be presumed to be of conventional design.

As is evident, the gain of amplifier D depends upon the lay-out of photo-resistor F and also of sweep generator S.

The sweep generator may be of the type which generates a saw-tooth signal each time it is triggered by a signal of sufficient amplitude applied to its input from the amplifier. The generator is of a type suitable to be triggered by an input voltage pulse and may be equipped either with transistors or vacuum tubes. A transistorized monostable flip-flop generator has been found to be suitable.

The saw-tooth signal generated by sweep generator S when triggered by the signal fed to it from amplifier D is supplied to deflecting means B of a cathode ray oscilloscope or to a cathode ray picture tube of an infra-red television camera. As is evident, the cathode ray image tube will operate in the manner of an oscilloscope tube.

Both the oscilloscope tube and the deflecting means therefor should be visualized to be conventional and the design thereof does not constitute part of the invention. As previously pointed out, the invention is only concerned with the problem of triggering the sweep generator of the cathode ray tube at a predetermined moment of time in reference to a datum value or reference point.

It is apparent from the previous explanation that the light originating at the source K and collimated by lens system L1 is incident upon the lens system L2 which focuses the light at the point at which the light sensitive device F is located if and when the rotary prism is in one of several specific angular positions. Any wandering of the light spot formed by the focusing action of lens system L2 as may occur will be within a small narrow range in reference to the location of the device F. The angular velocity of wandering of the light spot is approximately twice that of the rotational velocity of the respective reflecting surface of the prism such as surface R1. When the device F such as a photo-diode has a very small size or when a member having a very narrow slot such as a reticle is interposed in the light beam between lens system L2 and the device F closely adjacent to the latter, amplifier D functions in the manner of a detector in addition to amplifying produces a rapidly rising pulse of short duration. FIGS. 2 and 3 show diagrammatically such reticle. As seen in FIG. 2 the reticle is interposed between photo-resistor F and condensing lens L2. The reticle has an elongate slot S1 the minor axis of which is placed in the direction of movement of the light beam as is clearly indicated in the figures.

FIG. 2 shows the outline of the light beam as it impinges on the reticle and also the outline of the portion of the light beam passing through slot S1 and impinging upon photoelectric resistor F. The movement of the light beam is indicated in FIG. 3 by an upwardly pointing arrow. When now the sweep generator is arranged in a well understood and conventional manner so that it is started by the leading edge of a rapidly rising pulse the object of the invention is achieved, namely, to start the sweep generator only if and when one of the reflecting surfaces of the prism accurately occupies a definite angular position in relation to a stationary reference point or datum value.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A control device for controlling deflecting means deflecting an electron beam, said control device comprising in combination:

deflecting means for deflecting the electron beam;
   a sweep generator connected in circuit with said deflecting means to activate the deflecting means in response to a signal generated by said sweep generator;
   a rotary prism having several light reflecting peripheral surfaces;
   a source of light for directing a beam of light toward said rotary prism to impinge upon successive reflecting surfaces thereof during rotation of the prism; and
   a light sensitive means generating a signal in response to light incident thereupon and disposed in an optical relationship with said rotary prism such that light impinging upon successive reflecting surfaces of the prism is deflected to the light sensitive means, said light sensitive means being connected in circuit with said sweep generator to activate the generator in response to each signal received from the light sensitive means, whereby the activation of the deflecting means is controlled by the angular position of the rotary prism at a given moment of time.

2. The control device according to claim 1 wherein a collimating lens means is optically interposed between said source of light and said rotary prism for directing a collimated light beam upon said prism.

3. The control device according to claim 2 wherein a condenser lens means is optically interposed between said rotary prism and said light sensitive means for focusing collimated light beams deflected by successive reflecting surfaces of the prism upon said light sensitive means, said light sensitive means being located at the focal point of the condenser lens means.

4. A control device according to claim 1 wherein said light sensitive means is a photoelectric means.

5. A control device according to claim 4 wherein said photoelectric means is a photo-diode.

6. A control device according to claim 1 wherein a member including an elongated slot is interposed in the path of the light beam deflected by successive reflecting surfaces of the prism in a position closely adjacent to said light sensitive means, the long axis of said slot being parallel to the rotational axis of said rotary prism.

References Cited

UNITED STATES PATENTS

| | | | |
|---|---|---|---|
| 2,155,509 | 4/1939 | Schroter | 315—19 X |
| 2,157,468 | 5/1939 | Walton | 178—7.6 |
| 2,254,624 | 9/1941 | Rinia | 178—7.6 |
| 2,639,421 | 5/1963 | Miller | 178—7.6 X |
| 3,087,987 | 4/1963 | Stone | 178—7.6 |

RODNEY D. BENNETT, JR., Primary Examiner

B. L. RIBANDO, Assistant Examiner

U.S. Cl. X.R.

250—233